United States Patent [19]
Conway et al.

[11] 3,836,972
[45] Sept. 17, 1974

[54] FOUR-HORN RADIOMETRIC TRACKING RF SYSTEM

[75] Inventors: William H. Conway, Hacienda Heights; Jerry C. Aukland, Fullerton, both of Calif.

[73] Assignee: The United States of America as represented by the Secretary of the Air Force, Washington, D.C.

[22] Filed: Apr. 16, 1973

[21] Appl. No.: 351,670

[52] U.S. Cl........ 343/100 ME, 343/16 LS, 343/120
[51] Int. Cl.............................................. G01w 1/00
[58] Field of Search......... 343/100 ME, 120, 16 LS, 343/16 M

[56] References Cited
UNITED STATES PATENTS

| | | |
|---|---|---|
| 2,821,701 | 1/1958 | Vogeley, Jr. et al............. 343/16 M |
| 3,175,215 | 3/1965 | Blasberg et al................... 343/16 M |
| 3,466,654 | 9/1969 | Abronson..................... 343/100 ME |

Primary Examiner—Maynard R. Wilbur
Assistant Examiner—Richard E. Berger
Attorney, Agent, or Firm—Harry A. Herbert, Jr.; J. L. Siegel

[57] ABSTRACT

A radiometric system having two pairs of null seeking horns with two positional outputs and an amplitude output for summing and automatic gain control. The positional output in each pair is constantly switched alternately between adjacent horns in each pair. Each of the horns not connected to the positional outputs is fed to a third switch which feeds the sum and the AGC circuits.

3 Claims, 1 Drawing Figure

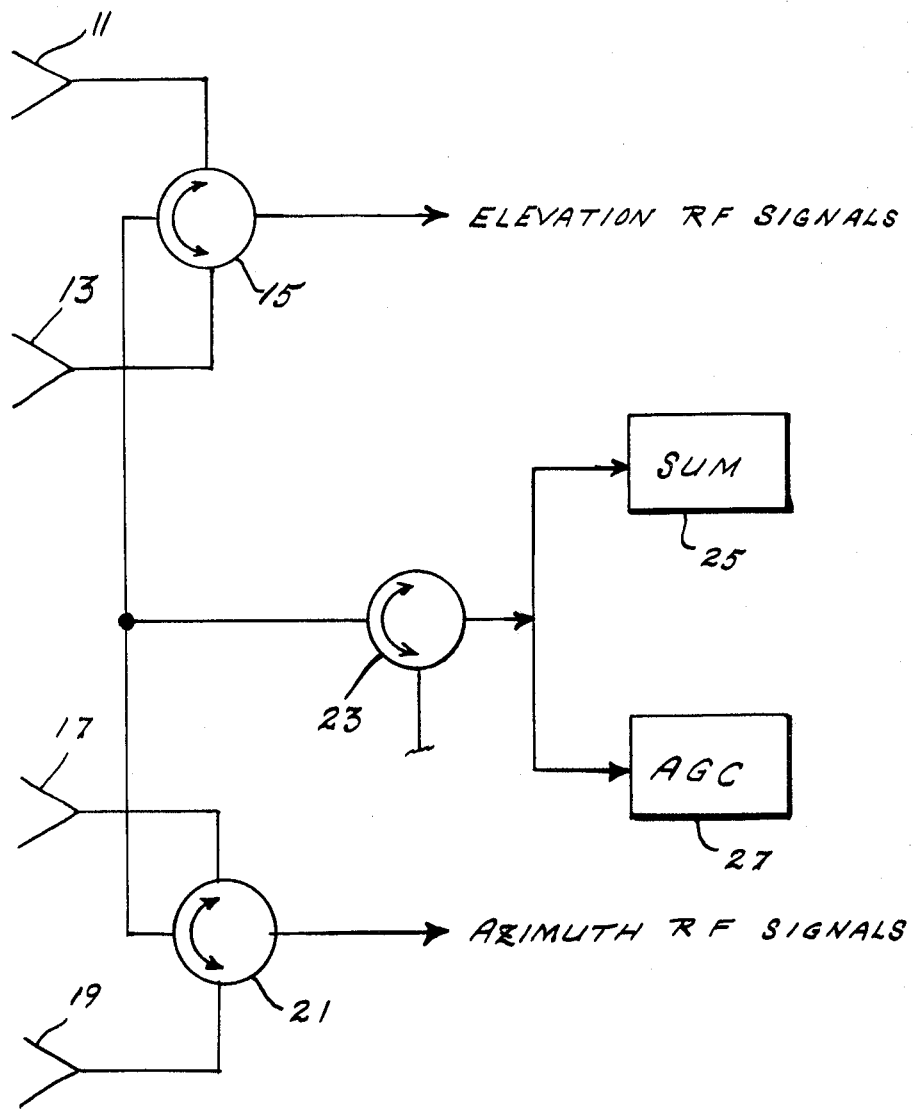

FOUR-HORN RADIOMETRIC TRACKING RF SYSTEM

BACKGROUND OF THE INVENTION

This invention relates to sequential lobing radiometers, and more particularly to two coordinate radiometers with a summing output.

Tracking radiometric systems derive their signals to the tracking mount from two separate radiometers. The signal to each radiometer is from two separate antenna horns which when subtracted give a 0 signal level or null signal level. As these devices are null seeking, only angular target information is available. For experimental purposes it is usually required that a sum signal be available which gives information on target amplitude, size, etc. In addition, the sum signal serves as an AGC when required. To generate a sum signal previously required the use of an additional complete radiometric system or an additional horn to the tracking antenna. The disadvantage of this past technique is the addition of system complexity, weight and size, and in the case of the additional horn technique, a degradation in the sidelobe level. The additional horn technique requires that one tracking radiometer time share its signal thus resulting in a loss of overall sensitivity.

The invention disclosed herein is unique in that it derives both the null seeking capability and the sum signal information with only four antenna horns.

SUMMARY OF THE INVENTION

In a two coordinate null seeking radiometer system, an additional horn for summing is eliminated by using the horn that is switched off for the positional signals. Each of the normally off horns is fed to an additional switch which in turn feeds a summing circuit or an AGC circuit.

It is therefore an object of this invention to provide a tracking radiometric system that provides target amplitude information as well as target angular information.

It is another object to provide a tracking radiometric system having both amplitude information as well as angular information without adding an additional horn which would add to the system's complexity, weight and size.

It is still another object to provide a tracking radiometric system with both angular and amplitude information and having a low sidelobe level.

It is yet another object to provide a tracking radiometric system with both angular and amplitude information offering a greater sensitivity by avoiding time sharing.

These and other objects, features and advantages of the invention will become more apparent from the following description taken in connection with the illustrative embodiment in the accompanying drawing.

DESCRIPTION OF THE DRAWING

The sole DRAWING is a functional block diagram of the embodiment of the invention.

DETAILED DESCRIPTION OF THE PREFERRED EMBODIMENT

The system of the present invention derives its null signals in the conventional manner by switching between adjacent antenna horns. Two pairs of horns are required to drive both the azimuth and elevation signals. As shown in the FIGURE, antennas or horns 11 and 13 are alternatively connected to the RF output for elevation. These horns are switched by circulating switch 15. Similarly horns 17 and 19 are alternately connected to the RF output for in azimuth and the switching is performed by circulating switch 21. Instead of time sharing one receiver with an additional fifth horn the sum signal can be obtained by summing the signals from the pair of "off" horns. For instance, when the elevation switch position is at horn 11, information is still available from horn 13 at the other port of the circulator switch. Simultaneously one horn is in the "off" position in the azimuth section which can also be used for the sum signal. The approach described utilizes both "off" antenna signals fed through switch 23 which are then added in a summing network. A separate radiometric receiver operated in typical Dicke mode can then be used to derive the desired sum signals. This technique of deriving sum signal information eliminates the complications of an additional system and the degradation to the antenna patterns of a five horn system, and the loss of 3 db of signal by time sharing with one radiometer. The same signal can also be fed to AGC circuit 27.

What is claimed is:

1. A radiometric system comprising:
   a. first and second pairs of adjacent radiometric horns;
   b. first and second switches alternately connecting one each of the first and second pairs of horns to a pair of outputs, one of the outputs being a positional output and the other being a common amplitude output; and
   c. a third switch fed by the common amplitude outputs.

2. A radiometric system according to claim 1 wherein the first, second and third switches are circulating switches.

3. A radiometric system according to claim 2 wherein the positional outputs are elevation and azimuth.

* * * * *